US011048128B2

United States Patent
Li et al.

(10) Patent No.: US 11,048,128 B2
(45) Date of Patent: Jun. 29, 2021

(54) DISPLAY PANEL AND MANUFACTURING METHOD THEREOF, AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Xiaoji Li, Beijing (CN); Yanli Zhao, Beijing (CN); Zhe Li, Beijing (CN); Haoxiang Fan, Beijing (CN); Peng Li, Beijing (CN); Lan Xin, Beijing (CN); Peng Qin, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 172 days.

(21) Appl. No.: 16/338,320

(22) PCT Filed: Sep. 14, 2018

(86) PCT No.: PCT/CN2018/105741
§ 371 (c)(1),
(2) Date: Mar. 29, 2019

(87) PCT Pub. No.: WO2019/056993
PCT Pub. Date: Mar. 28, 2019

(65) Prior Publication Data
US 2019/0235325 A1 Aug. 1, 2019

(30) Foreign Application Priority Data
Sep. 22, 2017 (CN) .......................... 201710866021.5

(51) Int. Cl.
*G02F 1/1343* (2006.01)
*G02F 1/1333* (2006.01)
(Continued)

(52) U.S. Cl.
CPC ...... *G02F 1/134363* (2013.01); *G02F 1/1337* (2013.01); *G02F 1/1341* (2013.01);
(Continued)

(58) Field of Classification Search
CPC ........... G02F 1/134363; G02F 1/13439; G02F 1/133345; G02F 1/1337; G02F 1/1341;
(Continued)

(56) References Cited

U.S. PATENT DOCUMENTS 8,736,800 B2 5/2014 Chang et al.
9,122,109 B2 9/2015 Zhao et al.
(Continued)

FOREIGN PATENT DOCUMENTS

CN 101782702 A 7/2010
CN 102707511 A 10/2012
(Continued)

OTHER PUBLICATIONS

International Search Report dated Dec. 19, 2018 issued in corresponding International Application No. PCT/CN2018/105741.
(Continued)

*Primary Examiner* — Phu Vu
(74) *Attorney, Agent, or Firm* — Nath, Goldberg & Meyer; Joshua B. Goldberg (57) ABSTRACT

A display panel and a manufacturing method thereof, and a display device are provided. The display panel includes a first substrate and a second substrate disposed opposite to each other, and a liquid crystal layer therebetween; and at least one pixel electrode and at least one common electrode disposed on at least one of the first substrate and the second
(Continued)

substrate; wherein at least one orthographic projection of the at least one pixel electrode on a first base substrate of the first substrate and at least one orthographic projection of the at least one common electrode on the first base substrate are alternately arranged along a first direction in which the first base substrate extends; and a ratio of a height of the at least one pixel electrode to a thickness of the liquid crystal layer is in a range of 20%-50.

6 Claims, 6 Drawing Sheets

(51) Int. Cl.
  *G02F 1/1337* (2006.01)
  *G02F 1/1341* (2006.01)
  *G02F 1/1335* (2006.01)
(52) U.S. Cl.
  CPC .... *G02F 1/13439* (2013.01); *G02F 1/133345* (2013.01); *G02F 1/133514* (2013.01); *G02F 1/133354* (2021.01); *G02F 1/134318* (2021.01); *G02F 2201/121* (2013.01); *G02F 2201/123* (2013.01)
(58) Field of Classification Search
  CPC ... G02F 1/133514; G02F 2001/134318; G02F 2001/133354; G02F 2201/123; G02F 2201/121; G02F 1/134309
  See application file for complete search history.

(56) References Cited

U.S. PATENT DOCUMENTS

| 10,025,147 | B2 | 7/2018 | Ma |
| 10,162,224 | B2 | 12/2018 | Tang |
| 10,371,992 | B2 | 8/2019 | Tang |
| 2011/0141421 | A1 | 6/2011 | Lee et al. |
| 2012/0327350 | A1* | 12/2012 | Chang ................ G02F 1/133707 349/139 |
| 2013/0135563 | A1* | 5/2013 | Kubota .............. G02F 1/133528 349/96 |
| 2014/0204327 | A1 | 7/2014 | Cheng et al. |
| 2015/0268524 | A1* | 9/2015 | Hirosawa .......... G02F 1/136286 349/138 |
| 2017/0249046 | A1* | 8/2017 | Hirosawa ............... G06F 3/0443 |

FOREIGN PATENT DOCUMENTS

| CN | 102841472 A | 12/2012 |
| CN | 103105707 A | 5/2013 |
| CN | 104714344 A | 6/2015 |
| CN | 104977769 A | 10/2015 |
| CN | 104991386 A | 10/2015 |

OTHER PUBLICATIONS

Office Action dated Aug. 1, 2019 issued in corresponding Chinese Application No. 201710866021.5.

* cited by examiner

DISPLAY PANEL AND MANUFACTURING METHOD THEREOF, AND DISPLAY DEVICE

This is a National Phase Application filed under 35 U.S.C. 371 as a national stage of PCT/CN2018/105741, filed Sep. 14, 2018, an application claiming the benefit of Chinese Application No. 201710866021.5, filed Sep. 22, 2017, the content of each of which is hereby incorporated by reference in its entirety.

TECHNICAL FIELD

The present disclosure relates to the field of display technology, and in particular to a display panel and a manufacturing method thereof, and a display device.

BACKGROUND

In-plane switching (IPS) type liquid crystal display devices have the advantages of fast response, large viewing angle and true colors, and no ripples while being touched.

SUMMARY

Embodiments of the present disclosure provide a display panel and a manufacturing method thereof, and a display device.

In one embodiment of the present disclosure, the display panel includes a first substrate and a second substrate disposed opposite to each other, and a liquid crystal layer formed therebetween, wherein the first substrate includes a first base substrate; and at least one pixel electrode and at least one common electrode disposed on at least one of the first substrate and the second substrate; wherein at least one orthographic projection of the at least one pixel electrode on the first base substrate and at least one orthographic projection of the at least one common electrode on the first base substrate are alternately arranged along a first direction in which the first base substrate extends; and a ratio of a height of the at least one pixel electrode to a thickness of the liquid crystal layer is in a range of 20%-50%; and/or a ratio of a height of the at least one common electrode to the thickness of the liquid crystal layer is in a range of 20%-50%/o.

In one embodiment, the at least one pixel electrode is disposed on the first base substrate; and the second substrate includes a second base substrate, and the at least one common electrode is disposed on the second base substrate.

In one embodiment, the at least one pixel electrode and the at least one common electrode are alternately arranged on the first base substrate.

In one embodiment, a distance between orthographic projections of any common electrode and a pixel electrode adjacent to the common electrode in the first direction on the first base substrate is constant.

In one embodiment, the distance is in a range of 4 µm-16 µm.

In one embodiment, the height of the at least one pixel electrode is in a range of 0.56 µm-1.6 µm; and/or the height of the at least one common electrode is in a range of 0.56 µm-1.6 µm.

In one embodiment, a width of the at least one pixel electrode in the first direction is in a range of 0.5 µm-2.5 µm; and a width of the at least one common electrode in the first direction is in a range of 0.5 µm-2.5 µm.

In one embodiment, the at least one pixel electrode is made of a metal material; and/or the at least one common electrode is made of a metal material.

In one embodiment, each of the at least one pixel electrode includes a first base located on a side of the first base substrate proximal to the liquid crystal layer, and a first conductive sleeve which covers sides of the first base, and a surface of the first base proximal to the liquid crystal layer; and/or each of the at least one common electrode includes a second base located on a side of the second base substrate proximal to the liquid crystal layer, and a second conductive sleeve which covers sides of the second base, and a surface of the second base proximal to the liquid crystal layer.

In one embodiment, the first substrate further includes a passivation layer located on a side of the first base substrate proximal to the second substrate, and a first alignment layer located on a side of the passivation layer distal to the first base substrate; and the at least one pixel electrode is located between the passivation layer and the first alignment layer.

In one embodiment, the second substrate further includes a color filter layer located on a side of the second base substrate proximal to the first substrate, and a second alignment layer located on a side of the color filter layer distal to the second base substrate; and the at least one common electrode is located between the color filter layer and the second alignment layer.

Embodiments of the present disclosure further provide a display device, including the aforesaid display panel and a backlight source for providing backlight for the display panel.

Embodiments of the present disclosure further provide a manufacturing method of a display panel, including steps of forming a first substrate and a second substrate such that the first substrate includes a first base substrate and at least one pixel electrode and at least one common electrode are disposed on at least one of the first substrate and the second substrate; aligning and assembling the first substrate and the second substrate together such that at least one orthographic projection of the at least one pixel electrode on the first base substrate and at least one orthographic projection of the at least one common electrode on the first base substrate are alternately arranged along a first direction in which the first base substrate extends; and forming a liquid crystal layer between the first substrate and the second substrate such that a ratio of a height of the at least one pixel electrode to a thickness of the liquid crystal layer is in a range of 20%-50%; and/or a ratio of a height of the at least one common electrode to the thickness of the liquid crystal layer is in a range of 20%-50%.

In one embodiment, the step of forming a first substrate and a second substrate such that the first substrate includes a first base substrate and at least one pixel electrode and at least one common electrode are disposed on at least one of the first substrate and the second substrate includes steps of forming the at least one pixel electrode on the first base substrate of the first substrate; and forming the at least one common electrode on a second base substrate of the second substrate.

In one embodiment, the step of forming a first substrate and a second substrate such that the first substrate includes a first base substrate and at least one pixel electrode and at least one common electrode are disposed on at least one of the first substrate and the second substrate includes forming the at least one pixel electrode and the at least one common electrode on the first base substrate of the first substrate.

In one embodiment, the step of forming the at least one pixel electrode on the first base substrate of the first substrate includes steps of forming a first conductive material film on the first base substrate; and patterning the first conductive material film to obtain a pattern of the at least one pixel electrode; and the step of forming the at least one common electrode on a second base substrate of the second substrate includes steps of forming a second conductive material film on the second base substrate; and patterning the second conductive material film to obtain a pattern of the at least one common electrode.

In one embodiment, the step of forming the at least one pixel electrode and the at least one common electrode on the first base substrate of the first substrate includes forming a first conductive material film on the first base substrate; and patterning the first conductive material film to obtain patterns of the at least one pixel electrode and the at least one common electrode.

In one embodiment, the first conductive material film is made of a metal material; and/or the second conductive material film is made of a metal material.

In one embodiment, the step of forming the at least one pixel electrode on the first base substrate of the first substrate includes forming a first insulating material film on the first base substrate; patterning the first insulating material film to obtain a pattern of at least one first base; forming a third conductive material film on a side of the first base substrate proximal to the first base; and patterning the third conductive material film to obtain a pattern of at least one first conductive sleeve, the first conductive sleeve being in one-to-one correspondence with the first base, and covering sides of the corresponding first base, and a surface of the corresponding first base distal to the first base substrate; and/or the step of forming the at least one common electrode on a second base substrate of the second substrate includes forming a second insulating material film on the second base substrate; patterning the second insulating material film to obtain a pattern of at least one second base; forming a fourth conductive material film on a side of the second base substrate proximal to the second base; and patterning the fourth conductive material film to obtain a pattern of at least one second conductive sleeve, the second conductive sleeve being in one-to-one correspondence with the second base, and covering sides of the corresponding second base, and a surface of the corresponding second base distal to the second base substrate.

In one embodiment, the step of forming the at least one pixel electrode on the first base substrate of the first substrate includes forming a first insulating material film on the first base substrate; patterning the first insulating material film to obtain a pattern of at least one first base; and spraying or printing a third conductive material onto an outer surface of the first base to obtain a pattern of at least one first conductive sleeve, the first conductive sleeve being in one-to-one correspondence with the first base, and covering sides of the corresponding first base, and a surface of the corresponding first base distal to the first base substrate; and/or the step of forming the at least one common electrode on a second base substrate of the second substrate includes forming a second insulating material film on the second base substrate; patterning the second insulating material film to obtain a pattern of at least one second base; and spraying or printing a fourth conductive material onto an outer surface of the second base to obtain a pattern of at least one second conductive sleeve, the second conductive sleeve being in one-to-one correspondence with the second base, and covering sides of the corresponding second base, and a surface of the corresponding second base distal to the second base substrate.

DETAILED DESCRIPTION

In order to enable a person skilled in the art to better understand technical solutions of the present disclosure, a display panel, a manufacturing method thereof, and a display device provided by the present disclosure will be further described in detail below with reference to the accompanying drawings.

For the purposes of illustration, as an example, a voltage applied to common electrodes is a ground voltage (is approximately equal to 0V) in the present disclosure.

"Driving voltage" in the present disclosure refers to a pixel voltage applied to pixel electrodes when a transmittance of the display panel reaches its maximum value. In practical application, the driving voltage is supplied by a driver IC to a source driver, and then is converted by the source driver into pixel voltages corresponding to 256 different grayscales, wherein a maximum value of the pixel voltages is equal to a value of the driving voltage.

The "transmittance" of the display panel in the present disclosure refers to a ratio of light intensity of a light emergent surface of the display panel to that of a light incident surface of the display panel.

Figure 1:
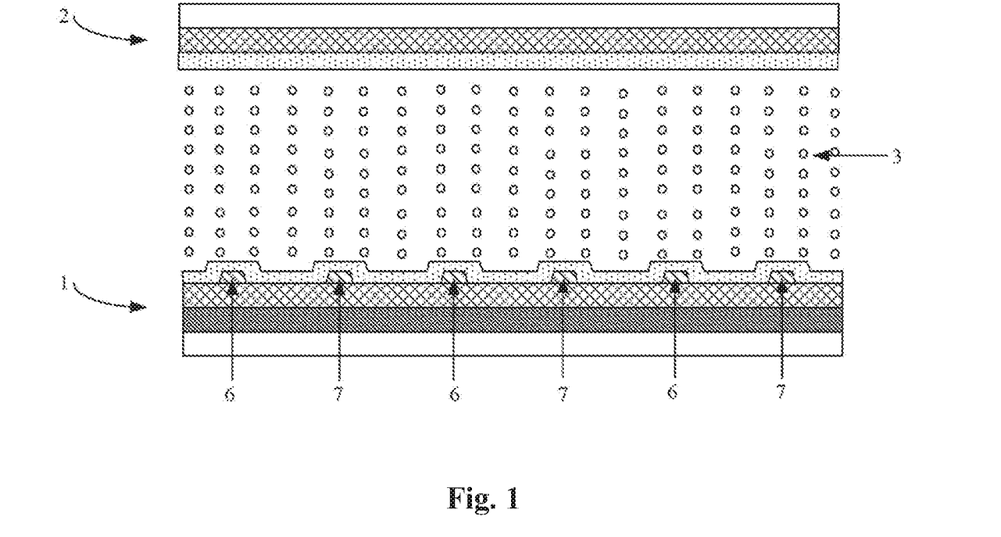
FIG. 1 is a cross sectional diagram of an IPS-type display panel in the related art.

FIG. 1 is a cross sectional diagram of an IPS-type display panel in the related art. As shown in FIG. 1, a plurality of pixel electrodes 6 and a plurality of common electrodes 7 are disposed in a same layer on an array substrate 1 and are alternately arranged, and both the pixel electrodes 6 and the common electrodes 7 are strip shaped or plate shaped, and have small heights, such as 0.04 μm. A thickness of a liquid crystal cell (a thickness of a liquid crystal layer) is usually in a range of 2.8 μm-3.2 μm. When there is no electric field, liquid crystal molecules in the liquid crystal layer 3 are kept in a horizontal state under the action of an alignment layer; and when voltages are applied to the common electrodes 7 and the pixel electrodes 6 respectively and a voltage difference is generated therebetween, a horizontal deflection electric field may be formed within the liquid crystal layer 3, so as to drive the liquid crystal molecules to deflect in a horizontal plane.

In practical application, when the voltages are applied to the common electrodes 7 and the pixel electrodes 6, the electric field formed is only distributed close to the array substrate 1, and strength of the electric field close to a color filter substrate 2 is weak or even there is no electric field. Therefore, the liquid crystal molecules close to the color filter array 2 are mainly driven to deflect by deflection of the liquid crystal molecules in middle positions of the liquid crystal layer. In view of that, usually, only by applying a relatively high driving voltage, the deflection electric field is distributed close to the color filter substrate 2 to the greatest extent, so as to drive the liquid crystal molecules close to the color filter array 2 to deflect. However, the high driving voltage makes more requirements for the driver IC and increases a load on the driver IC.

In order to drive the liquid crystal molecules close to the color filter array 2 to deflect to the greatest extent under a reduced driving voltage, an embodiment of the present application provides a display panel, including a first substrate and a second substrate disposed opposite to each other, and a liquid crystal layer therebetween; and at least one pixel electrode and at least one common electrode disposed on at least one of the first substrate and the second substrate; wherein, an orthographic projection of the at least one pixel electrode on a first base substrate and an orthographic projection of the at least one common electrode on the first base substrate are alternately arranged along a first direction in which the first base substrate extends; and a ratio of a height of the at least one pixel electrode to a thickness of the liquid crystal layer is in a range of 20%-50%; and/or a ratio of a height of the at least one common electrode to the thickness of the liquid crystal layer is in a range of 20%-50%.

In the display panel of the present application, by increasing heights of the pixel electrodes and the common electrodes, the ratios of the heights of the pixel electrodes and the common electrodes to the thickness of the liquid crystal layer are significantly increased in relative to the related art, that is, a depth of the electric field formed between the pixel electrodes and the common electrodes (a length of an area of the liquid crystal layer covered by the deflection electric field in a longitudinal direction) is increased, so as to drive the liquid crystal molecules, for example, close to an opposite substrate.

Figure 2:
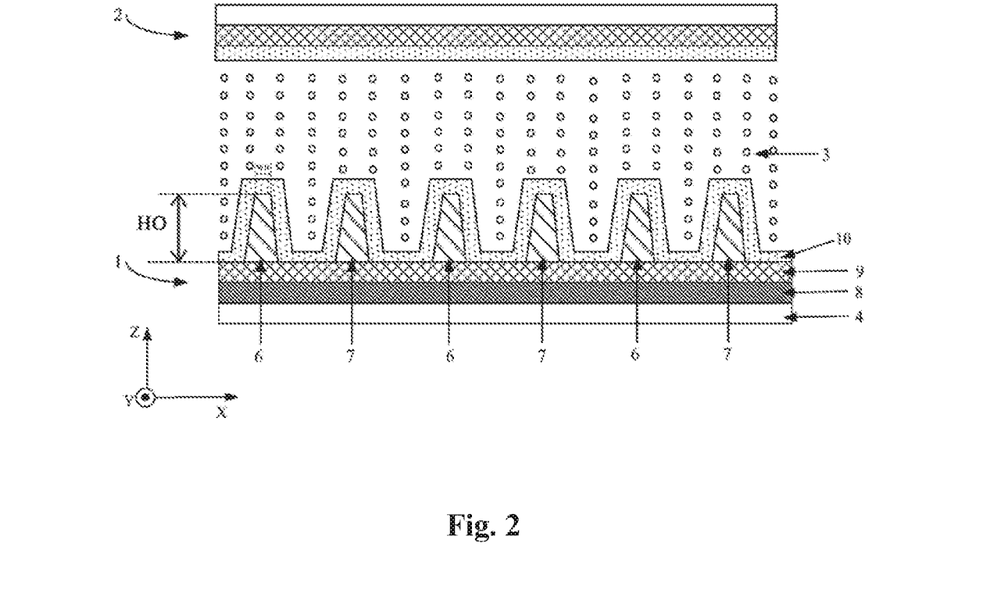
FIG. 2 is a structural schematic diagram of a display panel provided by an embodiment of the present disclosure.

FIG. 2 shows a display panel according to an embodiment of the present disclosure, which is based on the IPS-type liquid crystal display panel in the related art shown in FIG. 1, including a first substrate 1 and a second substrate 2 which are disposed opposite to each other, and a liquid crystal layer 3 disposed therebetween. The first substrate 1 includes a first base substrate 4, and a plurality of pixel electrodes 6 and a plurality of common electrodes 7 disposed on the first base substrate 4; the plurality of pixel electrodes 6 and common electrodes 7 are all strip shaped, and are alternately arranged along a first direction (i.e., direction X shown in FIG. 2) in which the first base substrate 4 extends. By comparison with the IPS-type liquid crystal display panel in the related art shown in FIG. 1, a ratio of a height H0 of the pixel electrode 6/common electrode 7 to a thickness of the liquid crystal layer is significantly increased in the display panel according to the embodiment of the present disclosure shown in FIG. 2, so that a depth of a deflection electric field formed between the common electrodes 7 and the pixel electrodes 6 (a length of an area of the liquid crystal layer 3 covered by the deflection electric field in a longitudinal direction Z) is increased, which allows the deflection electric field to more easily cover the liquid crystal molecules close to the color filter substrate and in the middle positions of the liquid crystal layer. Therefore, the required driving voltage is much lower.

As mentioned above, in the related art, both the pixel electrodes and the common electrodes have small heights of about 0.04 μm, and the thickness of liquid crystal cell is in a range of 2.8 μm-3.2 μm. As shown in FIG. 2, in order to increase the field depth of the electric field formed between the pixel electrodes 6 and the common electrodes 7, in one embodiment of the present application, the pixel electrodes and the common electrodes disposed on the same array substrate have larger heights, for example, which may be equal to 20%-50% of the thickness of liquid crystal cell, that is, the heights are in a range of 0.56 μm-1.6 μm.

In the embodiment shown in FIG. 2, the pixel electrodes 6 and the common electrodes 7 may be evenly distributed on the first substrate 1, and have a same height, such as a height H0 of 0.8 μm. Like that in the IPS-type liquid crystal display panel in the related art shown in FIG. 1, a distance between a common electrode 7 and a pixel electrode 6 adjacent to the common electrode 7 is 12 μm.

The first substrate 1 may be an array substrate, and the second substrate 2 may be an opposite substrate, such as a color filter substrate. Optionally, each pixel electrode 6/common electrode 7 has an integral structure, and is made of a metal material, or an ITO material, wherein the metal material may improve contrast of the display panel, and the ITO material may increase the transmittance. In practical application, materials of the pixel electrodes 6 and the common electrodes 7 may be selected according to required parameters. In a case that the pixel electrodes 6 and the common electrodes 7 are made of a metal material, it is possible to design a width W0 of the pixel electrodes 6 and the common electrodes 7 to be small, such as 1 μm, so as to increase the transmittance.

Figure 3:
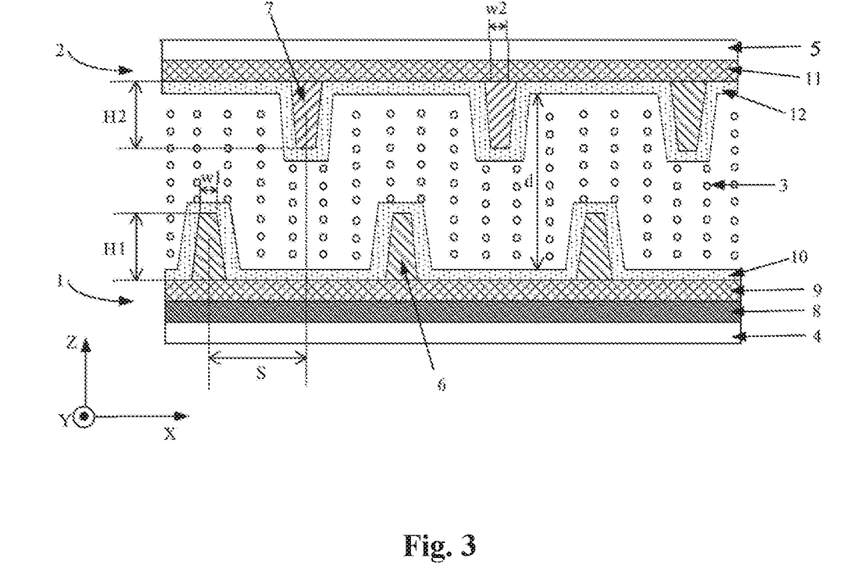
FIG. 3 is a structural schematic diagram of a display panel provided by an embodiment of the present disclosure.

According to an embodiment of the present disclosure, the common electrodes and the pixel electrodes in the display panel may be arranged on different substrates on two sides of the display panel, respectively, as shown in FIG. 3 which is a structural schematic diagram of a display panel provided by an embodiment of the present disclosure. By comparison with the IPS-type liquid crystal display panel in the related art shown in FIG. 1, the common electrodes 7 and the pixel electrodes 6 in the display panel shown in FIG. 3 are arranged on the second substrate 2 and the first substrate 1, respectively, so that the deflection electric field formed therebetween has a larger depth, and thus is more likely to cover the liquid crystal molecules close to the first substrate and the second substrate and in the middle positions of the liquid crystal layer. Therefore, the driving voltage required may be even lower.

Specifically, as shown in FIG. 3, the display panel, which is based on the IPS-type liquid crystal display panel in the related art shown in FIG. 1, includes a first substrate 1 and a second substrate 2 which are disposed opposite to each other, and a liquid crystal layer 3 therebetween; and the first substrate 1 includes a first base substrate 4 and a plurality of pixel electrodes 6 disposed on the first base substrate 4; and the second substrate 2 includes a second base substrate 5 and a plurality of common electrodes 7 disposed on the second base substrate 5, and orthographic projections of the plurality of pixel electrodes 6 on the first base substrate 4 and orthographic projections of the plurality of common electrodes 7 on the first base substrate 4 are alternately arranged in a direction X (a first direction) in which the first base substrate 4 extends.

As shown in FIG. 3, it is possible to provide higher pixel electrodes 6 and common electrodes 7. For example, it is possible to set a ratio of a height of the pixel electrodes 6 to a thickness of the liquid crystal layer to be in a range of 20%-50%, and/or set a ratio of a height of the common electrodes 7 to the thickness of the liquid crystal layer to be in a range of 20%-50%. A thickness of a liquid crystal layer of an IPS-type liquid crystal display panel is usually in a range of 2.8 μm-3.2 μm, so a height H1 of the pixel electrodes 6 and a height H2 of the common electrodes 7 may be set to be the same as each other and in a range of 0.56 μm-1.6 μm. Moreover, as shown in FIG. 3, distances between the orthographic projections of any two adjacent common electrode 7 and pixel electrode 6 in the first direction on the first base substrate 4 are equal to each other, for example, may be set in a range of 4 μm-16 μm.

The first substrate 1 may be an array substrate, and the second substrate 2 may be an opposite substrate. Optionally, each pixel electrode 6/common electrode 7 has an integral structure, and is made of a metal material so as to improve contrast of the display panel, in which case a width W1 of the pixel electrodes 6 and a width W2 of the common electrodes 7 may be set to be the same as each other, for example, in a range of 0.5 μm-2.5 μm. In addition to improving the contrast of the display panel, the pixel electrodes or the common electrodes may be designed to be small in width so as to increase the transmittance of the display panel. Optionally, it is possible to make each pixel electrode 6/common electrode 7 from a transparent ITO material so as to increase the transmittance.

In the display panel provided by the present disclosure, the common electrodes 7 and the pixel electrodes 6 are located on two substrates on two sides of the display panel, respectively, and a deflection electric field may be formed between the common electrodes 7 and the pixel electrodes 6 after applying pixel voltages to the pixel electrodes 6. By comparison with the IPS-type liquid crystal display panel in the related art shown in FIG. 1, the deflection electric field formed between the common electrodes 7 and the pixel electrodes 6 in the embodiment has a larger depth (a length of an area of the liquid crystal layer 3 covered by the deflection electric field in a longitudinal direction Z), and therefore is more likely to cover the liquid crystal molecules close to the first substrate 1 and the second substrate 2, and in the middle positions of the liquid crystal layer 3. Therefore, the required driving voltage is much lower.

Figure 4:
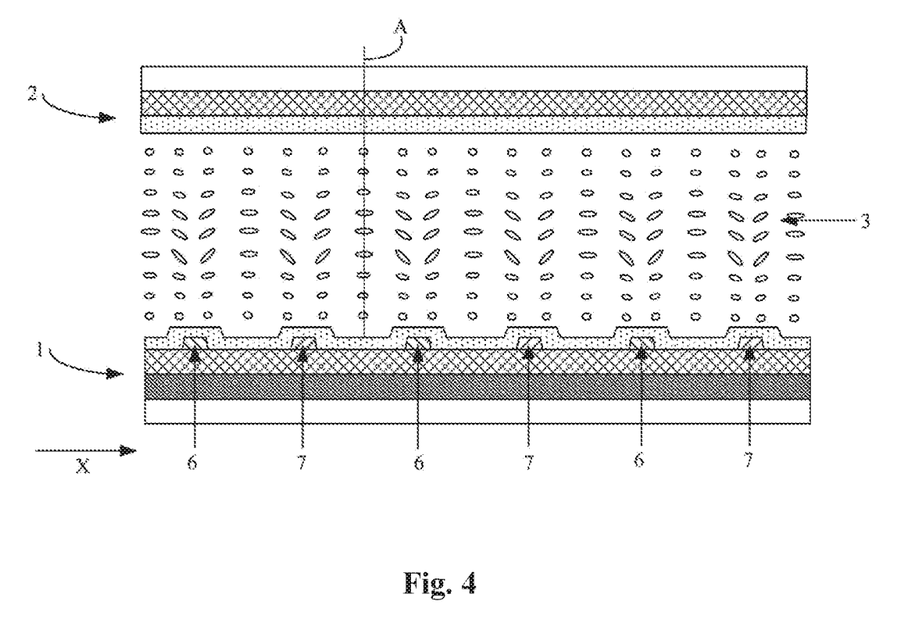
FIG. 4 is a schematic diagram illustrating the display panel of FIG. 1 in the related art where a voltage of 7.2V is applied to pixel electrodes.
Figure 5:
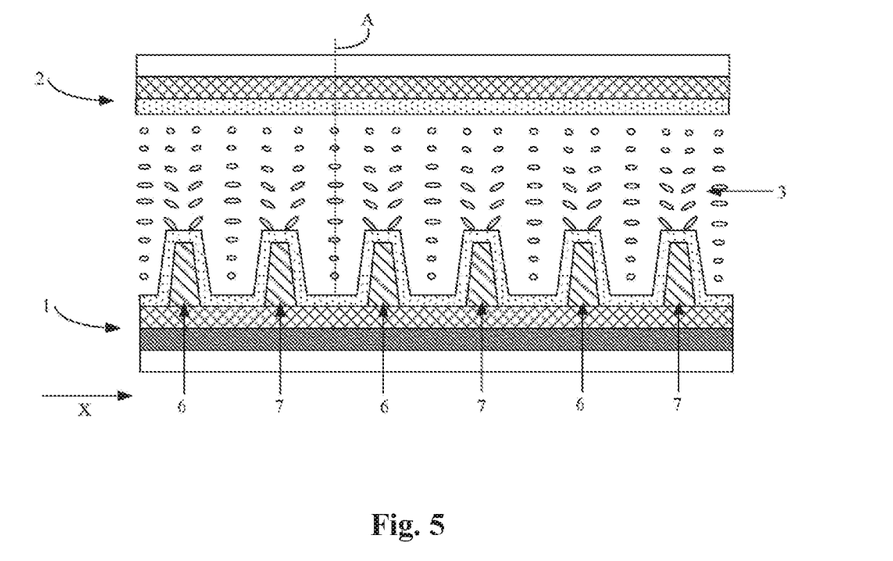
FIG. 5 is a schematic diagram illustrating the display panel according to the present disclosure where a voltage of 6.2V is applied to pixel electrodes.
Figure 6:
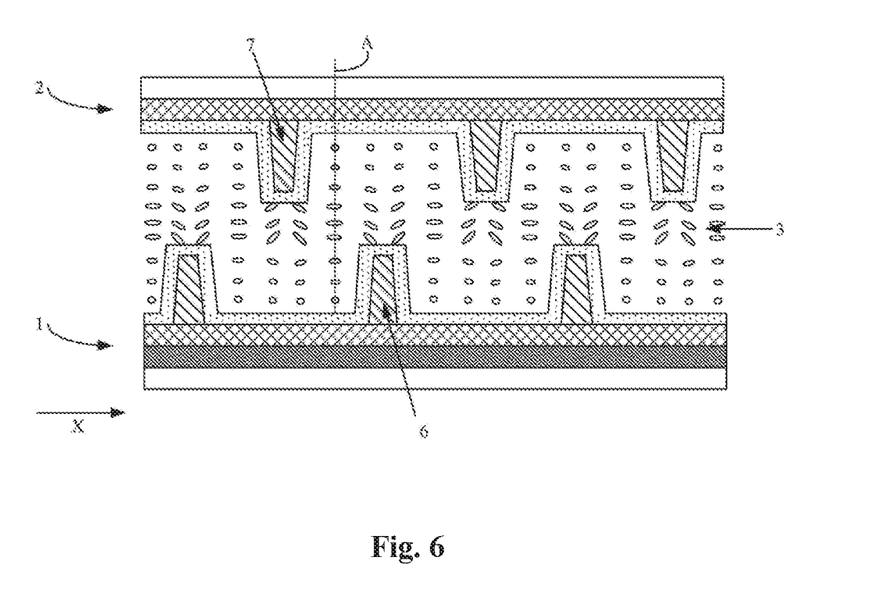
FIG. 6 is a schematic diagram illustrating the display panel according to the present disclosure where a voltage of 6.2V is applied to pixel electrodes.
Figure 7:
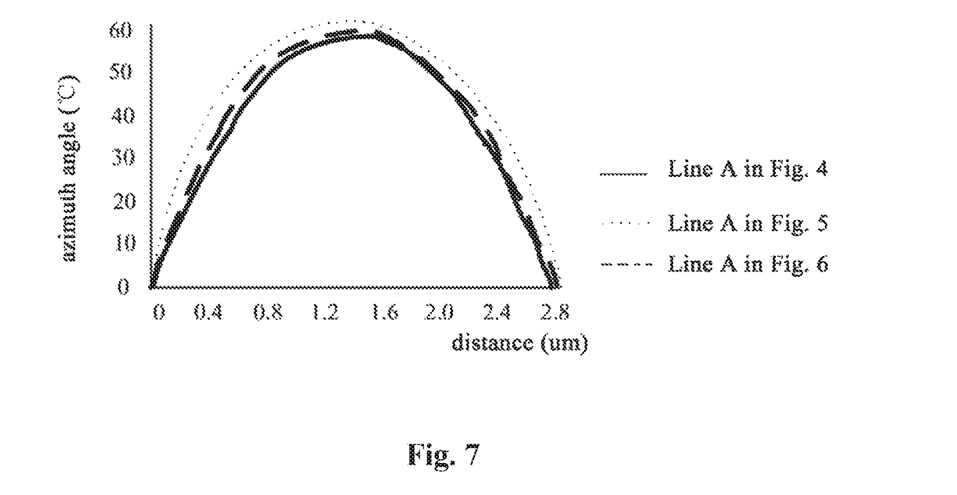
FIG. 7 is a schematic diagram of respective azimuth angles of liquid crystal molecules at different locations along lines A in FIGS. 4-6.

FIG. 4 is a schematic diagram illustrating the display panel in the related art where a voltage of 7.2V is applied to the pixel electrodes; FIG. 5 is a schematic diagram illustrating the display panel of FIG. 2 according to the present disclosure where a voltage of 6.2V is applied to pixel electrodes; FIG. 6 is a schematic diagram illustrating the display panel of FIG. 3 according to the present disclosure where a voltage of 6.2V is applied to pixel electrodes; and FIG. 7 is a schematic diagram of respective azimuth angles of the liquid crystal molecules at different locations along lines A in FIGS. 4-6.

Among the display panels shown in FIGS. 4-6, in FIG. 4, the thickness of liquid crystal cell may be 2.8 μm, the widths of all the pixel electrodes 6 and the common electrodes 7 may be 2.1 μm, and a distance between a pixel electrode 6 and a common electrode 7 adjacent to the pixel electrode 6 in the first direction X is 12 μm; in FIG. 5, the thickness of liquid crystal cell may be 2.8 μm, the widths of all the pixel electrodes 6 and the common electrodes 7 may be 1 μm, the heights of all the pixel electrodes 6 and the common electrodes 7 are 0.8 μm, that is, about 28.6% of the thickness of liquid crystal cell, and a distance between a pixel electrode 6 and a common electrode 7 adjacent to the pixel electrode 6 in the first direction X is 12 μm; and in FIG. 6, the thickness of liquid crystal cell may be 2.8 μm, the widths of all the pixel electrodes 6 and the common electrodes 7 may be 1 μm, the heights of all the pixel electrodes 6 and the common electrodes 7 are 0.8 μm, and a distance between orthographic projections of a pixel electrode 6 and a common electrode 7 adjacent to the pixel electrode 6 in the first direction X on the first substrate 1 is 12 μm.

It should be noted that in the present embodiment, a "distance" between a pixel electrode 6 and a common electrode 7 adjacent to the pixel electrode 6 in the first direction X specifically refers to a distance in the first direction X between a center line of a pixel electrode 6 and a center line of a common electrode 7 adjacent to the pixel electrode 6 in the first direction X, labeled as S, as shown in FIG. 3.

The line A is perpendicular to the first direction X and is located between a pixel electrode 6 and a common electrode 7 adjacent to the pixel electrode 6, and a distance between the line A and the pixel electrode 6 is equal to a distance between the line A and common electrode 7. The line A corresponds to a main light emergent area of corresponding pixel units in the display panel, and deflection states of the liquid crystal molecules on the line A may reflect a distribution for the electric field intensity of the corresponding pixel units to a great extent. A horizontal coordinate "distance" in FIG. 7 represents distances between the liquid crystal molecules on the line A and the first substrate 1.

In the display panel shown in FIG. 4, a voltage of 0V is applied to the common electrodes 7, and a voltage of 7.2V is applied to the pixel electrodes; and in the display panels shown in FIGS. 5 and 6, a voltage of 0V is applied to the common electrodes 7, and a voltage of 6.2V is applied to the pixel electrodes. It can be seen from FIG. 7 that the deflection states of the liquid crystal molecules on the lines A in FIGS. 5 and 6 are substantially the same as those in FIG. 4.

Figure 8:
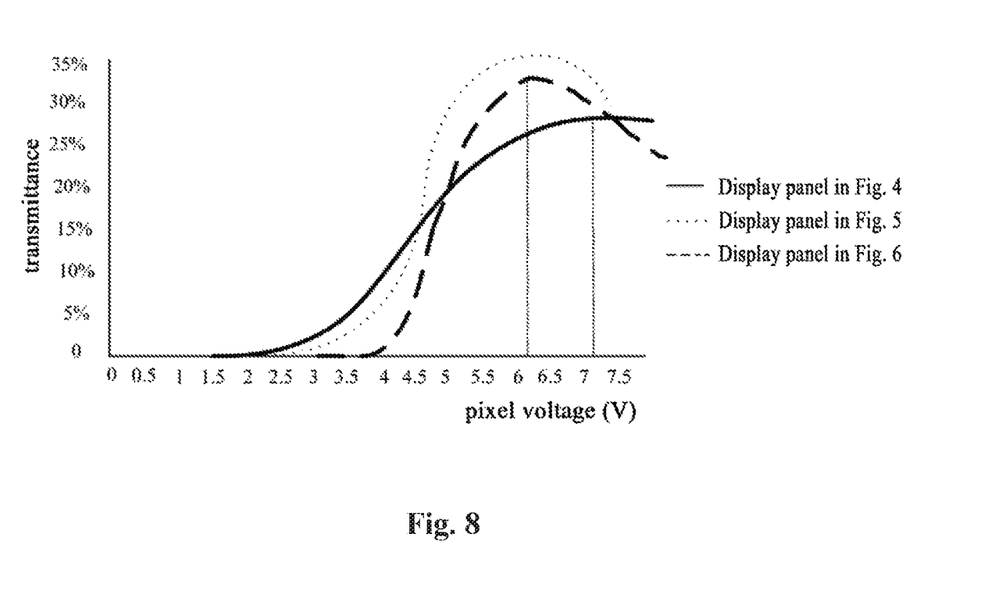
FIG. 8 is a schematic diagram showing respective pixel voltage-transmittance curves of the display panels shown in FIGS. 4-6.

FIG. 8 is a schematic diagram showing respective pixel voltage-transmittance curves of the display panels shown in FIGS. 4-6. As shown in FIG. 8, taking a maximum transmittance of the display panel in the related art shown in FIG. 4 as a reference value, a voltage applied to the pixel electrodes corresponding to the maximum transmittance is 7.2V, that is, the corresponding driving voltage of the display panel shown in FIG. 4 is 7.2V; by comparison with the display panel shown in FIG. 4, the maximum transmittances of the display panels of the present embodiments shown in FIGS. 5 and 6 may be increased by about 7.5%, wherein the maximum transmittance of the display panel shown in FIG. 5 is greater than that in FIG. 6, and the pixel voltages corresponding to the maximum transmittances are about 6.2V, that is, the corresponding driving voltages of the display panels shown in FIGS. 5 and 6 are about 6.2V.

It can be seen that, by comparison with the display panel in the related art shown in FIG. 4, the driving voltages of the display panels of the present application shown in FIGS. 5 and 6 may be reduced by about 1V. and the maximum transmittances thereof may be increased by 7.5%.

The increased transmittance of the display panel provided by the present embodiment is due to the following reason: it is known that regions of the display panel corresponding to the pixel electrodes 6 and the common electrodes 7 are opaque, but in the case where the widths of the pixel electrodes 6 and the common electrodes 7 in the present embodiment are smaller than those in the related art, and numbers of the pixel electrodes 6 and the common electrodes 7 arranged in the display panel (the numbers are determined by the distance between a pixel electrode 6 and a common electrode 7 adjacent to the pixel electrode 6, and further, the greater the distance is, the smaller the numbers are) are the same both in the present embodiment and in the related art, an area of light transmissive regions of the display panel provided by the present embodiment is larger than that in the related art. Therefore, the maximum transmittance of the display panel provided by the present embodiment is larger than that in the related art.

With reference to FIG. 3 again, in the case where the distance S between a pixel electrode 6 and a common electrode 7 adjacent to the pixel electrode 6 is constant, the smaller the width W1 of the pixel electrodes 6 and the width W2 of the common electrodes 7 are, the larger the maximum transmittance of the display panel is. However, since the pixel electrodes 6 and the common electrodes 7 in the present embodiment have certain heights, it is very likely that the pixel electrodes 6 and the common electrodes 7 are oblique or deformed if the widths W1 and W2 are too small. In view of the transmittance of the display panel and stability of the pixel electrodes 6 and the common electrodes 7, the width W1 of the pixel electrodes 6 in the first direction X may be set to be in a range of 0.5 μm-2.5 μm, and the width W2 of the common electrodes 7 in the first direction X may be set to be in a range of 0.5 μm-2.5 μm.

It should be noted that, in the present disclosure, lengths of the pixel electrodes 6 and the common electrodes 7 in a second direction Y are approximately equal to a length of one pixel unit on the display panel.

In the present embodiment, the distance S between any adjacent common electrode 7 and pixel electrode 6 in the first direction X may be constant, in which case all pixel units on the display panel are equal in size and are evenly distributed. Moreover, for all pixel units, display grayscales corresponding to a same pixel voltage are same, which causes a easy drive.

Optionally, the distance S between a common electrode 7 and a pixel electrode 6 adjacent to the common electrode 7 in the first direction X is in a range of 4 μm-16 μm. In the present disclosure, an electric field with certain intensity is formed between the pixel electrodes 6 and the common electrodes 7, and the smaller the distance S between a common electrode 7 and a pixel electrode 6 adjacent to the common electrode 7 in the first direction X is, the lower the voltage required to be applied to the pixel electrodes 6 is. That is, the smaller the distance between a common electrode 7 and a pixel electrode 6 adjacent to the common electrode 7 in the first direction X is, the lower the corresponding driving voltage of the display panel is. But, as the distance S between the common electrode 7 and the pixel electrode 6 is reduced, the numbers of the common electrodes 7 and the pixel electrodes 6 to be arranged in the display panel are increased. In the case where the widths W1 and W2 of the pixel electrodes 6 and the common electrodes 7 are constant, the area of the light transmissive regions of the display panel is reduced, which leads to a decrease in the maximum transmittance of the display panel. In the present disclosure, in view of requirements for the driving voltage and the transmittance, the distance S between the common electrode 7 and the pixel electrode 6 may be set in a range of 4 μm-16 μm.

In the present embodiment, by adjusting the distance S between a common electrode 7 and a pixel electrode 6 adjacent to the common electrode 7 and the widths W1 and W2 of the pixel electrodes 6 and the common electrodes 7, the driving voltage of the display panel may be reduced, and the maximum transmittance of the display panel may be kept not lower than an existing level.

As mentioned above, in the embodiment shown in FIG. 3 of the present application, the ratio of the height H1 of the pixel electrodes 6 to the thickness d of the liquid crystal layer 3 is in a range of 20%-50%, and the ratio of the height H2 of the common electrodes 7 to the thickness d of the liquid crystal layer 3 is in a range of 20%-50%. In the present embodiment, the greater the heights H1 and H2 of the pixel electrodes 6 and the common electrodes 7 are, the larger the depth of the electric field formed therebetween is, and the lower the driving voltage required by the display panel is; whereas, as the heights H1 and H2 of the pixel electrodes 6 and the common electrodes 7 are increased, the pixel electrodes 6 and the common electrodes 7 overlap with each other in the longitudinal direction Z, in which case a parasitic capacitance will be easily generated between the pixel electrodes 6 and the common electrodes 7, and will affect the pixel voltage applied to the pixel electrodes 6. In view of that, in the present disclosure, the ratio of the height H1 of the pixel electrodes 6 to the thickness d of the liquid crystal layer 3 may be set in a range of 20%-50%, and the ratio of the height H2 of the common electrodes 7 to the thickness d of the liquid crystal layer 3 may be set in a range of 20%-50%.

The thickness d of the liquid crystal layer 3 (the thickness of liquid crystal cell) is usually in a range of 2.8 μm-3.2 μm in practical application. In the present disclosure, the height H1 of the pixel electrodes 6 may be set in a range of 0.56 μm-1.6 μm, and the height H2 of the common electrodes 7 may be set in a range of 0.56 μm-1.6 μm.

In the present embodiment, the first substrate 1 may be an array substrate, including a plurality of thin film transistors (not shown) located on a side of the first base substrate 4 proximal to the second substrate 2, a passivation layer 9 located on a side of the thin film transistors distal to the first base substrate 4, and a first alignment layer 10 located on a side of the passivation layer 9 distal to the first base substrate 4, the pixel electrodes 6 are located between the passivation layer 9 and the first alignment layer 10, the thin film transistor includes a gate, a gate insulation layer 8, a source, a drain (the gate, source and drain are not shown), and the pixel electrode 6 is electrically connected with the drain of a corresponding thin film transistor. The second substrate 2 may be a color filter substrate, including a color filter layer 11 located on a side of the second base substrate 5 proximal to the first substrate 1, and a second alignment layer 12 located on a side of the color filter layer 11 distal to the second base substrate 5, and the common electrodes 7 are located between the color filter layer 11 and the second alignment layer 12. Wherein, both the first alignment layer 10 and the second alignment layer 12 are horizontal alignment layers.

Figure 9:
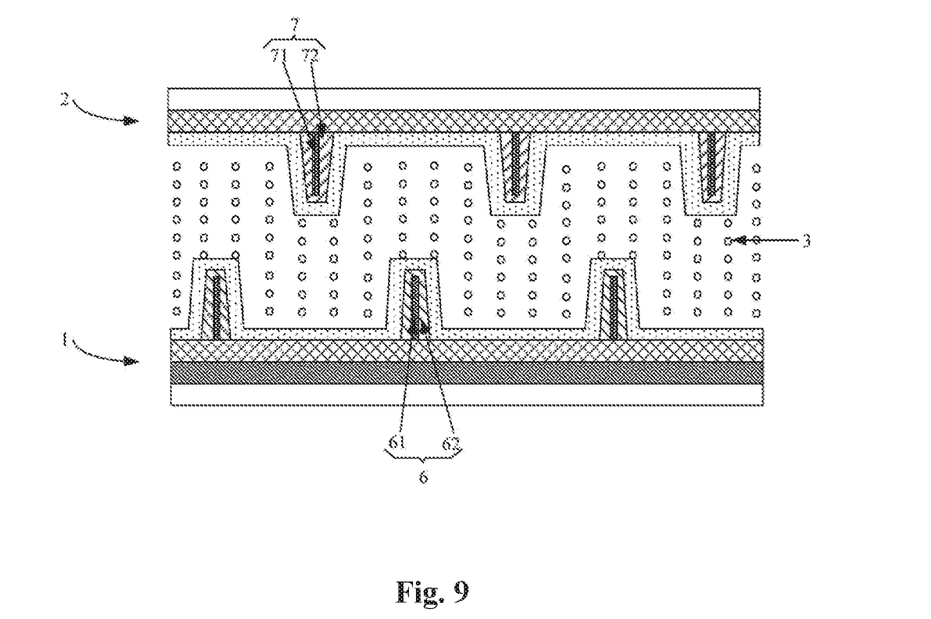
FIG. 9 is a cross sectional diagram of a display panel provided by an embodiment of the present disclosure.

FIG. 9 is a cross sectional diagram of a display panel provided by an embodiment of the present disclosure. As shown in FIG. 9, the present embodiment is different from those in the above embodiments in that none of the pixel electrodes 6 and the common electrodes 7 in the present embodiment have an integral structure. Specifically, in the present embodiment, the pixel electrode 6 includes a first base 61 located on a side of the first base substrate 4 proximal to the second substrate 2, and a first conductive sleeve 62 which covers sides of the first base and a surface of the first base distal to the first base substrate 4; and the common electrode 7 includes a second base 71 located on a side of the second base substrate 5 proximal to the first substrate 1, and a second conductive sleeve 72 which covers sides of the second base and a surface of the second base distal to the second base substrate 5.

Optionally, both the first bases 61 and the second bases 71 are made of a resin material, and both the first conductive sleeves 62 and the second conductive sleeves 72 are made of a metal material or an ITO material.

It should be noted that, in one embodiment, one of the common electrodes 7 and the pixel electrodes 6 may have an integral structure made of a metal material, and the other may have a non-integral structure composed of bases and conductive sleeves.

Figure 10:
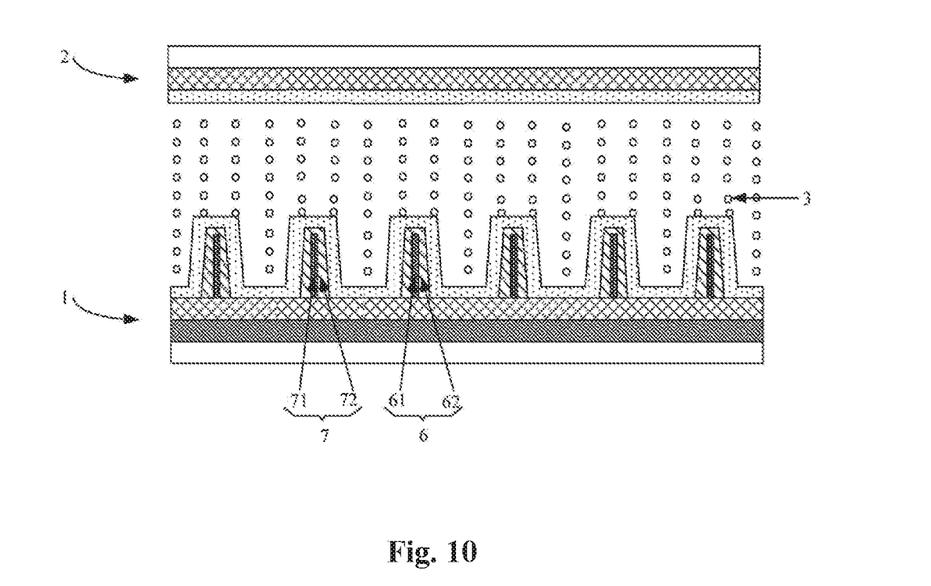
FIG. 10 is a cross sectional diagram of a display panel provided by an embodiment of the present disclosure.

FIG. 10 is a cross sectional diagram of a display panel provided by an embodiment of the present disclosure. Unlike FIG. 9, both the pixel electrodes 6 and the common electrodes 7 in the display panel shown in FIG. 10 are disposed on the first base substrate 4. In FIG. 10, the pixel electrode 6 includes a first base 61 located on a side of the first base substrate 4 proximal to the second substrate 2, and a first conductive sleeve 62 which covers sides of the first base and a surface of the first base distal to the first base substrate 4; and the common electrode 7 includes a second base 71 located on the side of the first base substrate 4 proximal to the second substrate 2, and a second conductive sleeve 72 which covers sides of the second base and a surface of the second base distal to the first base substrate 4. In the present embodiment, both the first bases 61 and the second bases 71 are made of a resin material, and both the first conductive sleeves 62 and the second conductive sleeves 72 are made of a metal material or an ITO material.

It should be noted that, in one embodiment, one of the common electrodes 7 and the pixel electrodes 6 may have an integral structure made of a metal material, and the other may have a non-integral structure composed of bases and conductive sleeves.

Figure 11:
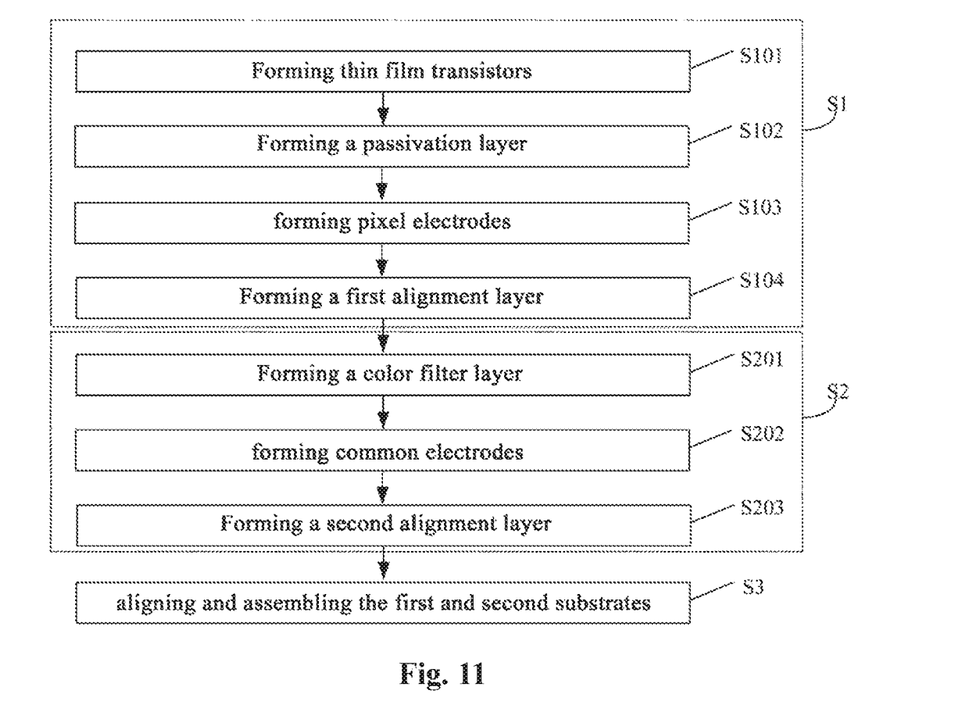
FIG. 11 is a flow chart illustrating a manufacturing method of a display panel provided by an embodiment of the present disclosure.

FIG. 11 is a flow chart illustrating a manufacturing method of a display panel provided by an embodiment of the present disclosure. As shown in FIG. 11, the manufacturing method is used for manufacturing the display panels of the above embodiments, and includes the following steps S1-S3:

Step S1, Forming a First Substrate.

The first substrate includes a first base substrate and at least one pixel electrode located thereon.

The first substrate in the present embodiment may be an array substrate, including thin film transistors, a passivation layer and a first alignment layer, and the pixel electrodes are located between the passivation layer and the first alignment layer.

Specifically, Step S1 includes the following steps S101-S104:

Step S101, forming the thin film transistors.

In Step S101, the thin film transistors may be formed on the first base substrate by existing thin film transistor fabrication processes, and the thin film transistor includes a gate, a gate insulation layer, a source and a drain. The specific fabrication processes will not be described herein in detail. It should be noted that the thin film transistors in the present disclosure may be bottom-gate type thin film transistors, or top-gate type thin film transistors.

Step S102, forming the passivation layer.

In Step S102, a passivation material film is formed on a side of the thin film transistors distal to the first base substrate, and is patterned once to obtain a pattern of a passivation layer. Vias are formed in regions of the passivation layer corresponding to the drains of the thin film transistors.

It should be noted that the patterning process in the present disclosure includes processes such as photoresist coating, exposure, development, etching, photolithography stripping, and so on.

Step S103, forming pixel electrodes.

In a case that the pixel electrodes are those according to the above embodiments that have an integral structure, the step of forming pixel electrodes includes: firstly, forming a first conductive material film on a side of the passivation layer distal to the first base substrate; and then, patterning the first conductive material film to obtain a pattern of pixel electrodes. Optionally, the first conductive material film is made of a metal material.

In a case that the pixel electrodes are those according to the above embodiments that have a non-integral structure, the step of forming pixel electrodes includes: firstly, forming a first insulating material film on a side of the passivation layer distal to the first base substrate; then patterning the first insulating material film to obtain a pattern of at least one first base; forming a third conductive material film on the side of the passivation layer distal to the first base substrate; and finally, patterning the third conductive material film to obtain a pattern of at least one corresponding first conductive sleeve formed on a surface of the at least one first base, so as to form a pattern of pixel electrodes. Optionally, the first insulating material film is made of an organic resin material, and the third conductive material film is made of a metal material.

Furthermore, after obtaining the pattern of at least one first base, it is possible to spray or print a third conductive material directly onto an outer surface of the first base so as to obtain the pattern of first conductive sleeves.

The pixel electrodes are connected with the drains of corresponding thin film transistors by vias in the passivation layer.

Optionally, widths of the pixel electrodes in a first direction are in a range of 0.5 µm-2.5 µm.

Optionally, a distance between adjacent pixel electrodes in the first direction is in a range of 8 µm-32 µm.

Optionally, heights of the pixel electrodes in a longitudinal direction are in a range of 0.561 µm-1.6 µm.

Step S104, forming the first alignment layer.

In Step S104, firstly, an alignment material film is formed on the side of the passivation layer distal to the first base substrate, and optionally, the alignment material film is made of polyimide; and then, the alignment material film is subject to a horizontal alignment process by means of rubbing alignment or photo-alignment, so as to obtain the first alignment layer.

Step S2, Forming a Second Substrate.

The second substrate includes a second base substrate and at least one common electrode located thereon.

The second substrate in the present embodiment may be a color filter substrate (an opposite substrate), including a color filter layer and a second alignment layer, and the common electrodes are located between the color filter layer and the second alignment layer.

Specifically, Step S2 includes the following steps S201-S203:

Step S201, forming the color filter layer.

In Step S201, patterns of black matrix and color matrix are formed on a side of the second base substrate by existing color filter layer fabrication processes. The specific fabrication processes will not be described herein in detail.

Step S202, forming common electrodes.

In a case that the common electrodes are those according to the above embodiments that have an integral structure, the step of forming common electrodes includes: firstly, forming a second conductive material film on a side of the color filter layer distal to the second base substrate; and then, patterning the second conductive material film to obtain a pattern of common electrodes. Optionally, the second conductive material film is made of a metal material or an ITO material.

In a case that the common electrodes are those according to the above embodiments that have a non-integral structure, the step of forming common electrodes includes: firstly, forming a second insulating material film on a side of the color filter layer distal to the second base substrate; then patterning the second insulating material film to obtain a pattern of at least one second base; forming a fourth conductive material film on a side of the color filter layer distal to the second base substrate; and finally, patterning the fourth conductive material film to obtain a pattern of at least one corresponding second conductive sleeve formed on a surface of the at least one second base, so as to form a pattern of common electrodes.

Optionally, the second insulating material film is made of an organic resin material, and the fourth conductive material film is made of a metal material or an ITO material.

Optionally, widths of the common electrodes in the first direction are in a range of 0.5 µm-2.5 µm.

Optionally, a distance between adjacent common electrodes in the first direction is in a range of 8 µm-32 µm.

Optionally, heights of the common electrodes in the longitudinal direction are in a range of 0.56 µm-1.6 µm.

Step S203, forming the second alignment layer.

In Step S204, firstly, an alignment material film is formed on the side of the color filter layer distal to the second base substrate, and optionally, the alignment material film is made of polyimide; and then, the alignment material film is subject to a horizontal alignment process by means of rubbing alignment or photo-alignment, so as to obtain the second alignment layer.

Step S3, aligning and assembling the first substrate and the second substrate.

The first substrate obtained in Step S and the second substrate obtained in Step S2 are aligned and assembled together so that an orthographic projection of the at least one pixel electrode on the first base substrate and an orthographic projection of the at least one common electrode on the first base substrate are alternately arranged along a first direction in which the first base substrate extends, and a liquid crystal layer is filled between the first substrate and the second substrate.

A distance between a common electrode and a pixel electrode adjacent to the common electrode in the first direction X may be equal. For example, the distance between a common electrode and a pixel electrode adjacent to the common electrode in the first direction is in a range of 4 µm-16 µm.

The above manufacturing method is used for manufacturing the display panel, as shown in FIGS. 3 and 9, in which the pixel electrodes and the common electrodes are disposed on the first substrate and the second substrate, respectively, which are opposite to each other. As for the display panel, as shown in FIGS. 2 and 10, in which the pixel electrodes and the common electrodes are disposed on the same substrate, the manufacturing method is different from that shown in FIG. 11 in that the method includes: forming a first conductive material film on the first base substrate; and patterning the first conductive material film to obtain patterns of the at least one pixel electrode and the at least one common electrode, as shown in Step S103' in FIG. 12.

For example, in a case that the pixel electrodes and the common electrodes are those according to the above embodiments that have an integral structure, the step of forming pixel electrodes and common electrodes includes: firstly, forming a first conductive material film on a side of the passivation layer distal to the first base substrate; and then, patterning the first conductive material film to obtain patterns of pixel electrodes and common electrodes. Optionally, the first conductive material film is made of a metal material.

In a case that the pixel electrodes and the common electrodes are those according to the above embodiments that have a non-integral structure, the step of forming pixel electrodes and common electrodes includes: firstly, forming a first insulating material film on a side of the passivation layer distal to the first base substrate; then, patterning the first insulating material film to obtain patterns of at least one first base and at least one second base; forming a third conductive material film on the side of the passivation layer distal to the first base substrate; and finally, patterning the third conductive material film to obtain a pattern of at least one corresponding first conductive sleeve formed on a surface of the at least one first base so as to form a pattern of pixel electrodes, and also to obtain a pattern of at least one corresponding second conductive sleeve formed on a surface of the at least one second base so as to form a pattern of common electrodes. Optionally, the first insulating material film is made of an organic resin material, and the third conductive material film is made of a metal material.

Furthermore, after obtaining the patterns of at least one first base and at least one second base, it is possible to spray or print a third conductive material directly onto outer surfaces of the first substrate and the second base so as to obtain the patterns of first conductive sleeve and second conductive sleeve.

Figure 12:
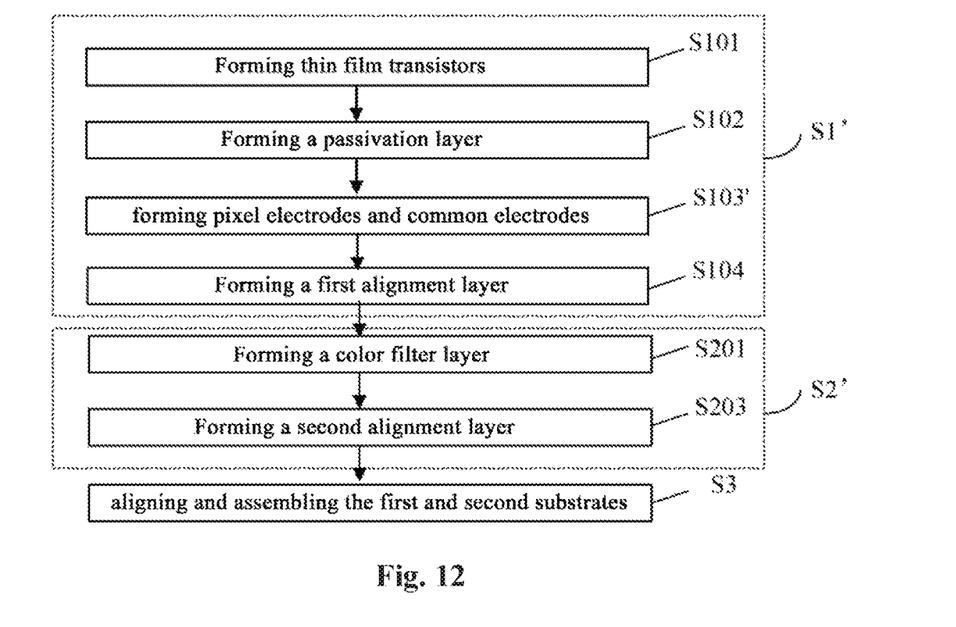
FIG. 12 is a flow chart illustrating a manufacturing method of a display panel provided by an embodiment of the present disclosure.

As shown in FIG. 12, in the above case, Step S1' includes Steps S101, S102, S103' and S104, and Step 2' includes Steps S201 and S203. Steps S101, S102, S104, S201, S203 and S3 are the same as those shown in FIG. 11, and thus will not be repeatedly described herein.

An embodiment of the present disclosure provides a display device, including the display panel according to the above embodiments, and a backlight source for providing backlight for the display panel. Reference may be made to the above embodiments for detailed description of the display panel, which will not be repeated herein.

Specifically, the display device in the present disclosure may be any product or component having a display function, such as a smart phone, a tablet computer, a TV, a display, a notebook computer, a digital photo frame, and a navigator.

It should be understood that the foregoing implementations are merely exemplary implementations adopted for describing the principle of the present disclosure, but the present disclosure is not limited thereto. Those of ordinary skill in the art may make various variations and improvements without departing from the spirit and essence of the present disclosure, and these variations and improvements shall be considered to fall into the protection scope of the present disclosure.

What is claimed is:

1. A manufacturing method of a display panel, comprising:
   forming a first substrate and a second substrate such that the first substrate comprises a first base substrate, and at least one pixel electrode and at least one common electrode are disposed on at least one of the first substrate and the second substrate;
   aligning and assembling the first substrate and the second substrate together such that that at least one orthographic projection of the at least one pixel electrode on the first base substrate and at least one orthographic projection of the at least one common electrode on the first base substrate are alternately arranged along a first direction in which the first base substrate extends; and
   forming a liquid crystal layer between the first substrate and the second substrate such that a ratio of a height of the at least one pixel electrode to a thickness of the liquid crystal layer is in a range of 20%-50%; and/or a ratio of a height of the at least one common electrode to the thickness of the liquid crystal layer is in a range of 20%-50%,
   wherein the forming a first substrate and a second substrate such that the first substrate comprises a first base substrate and at least one pixel electrode and at least one common electrode are disposed on at least one of the first substrate and the second substrate comprises:
   forming the at least one pixel electrode on the first base substrate of the first substrate; and
   forming the at least one common electrode on a second base substrate of the second substrate; wherein the forming the at least one pixel electrode on the first base substrate of the first substrate comprises:
   forming a first insulating material film on the first base substrate;
   patterning the first insulating material film to obtain a pattern of at least one first base;
   forming a third conductive material film on a side of the first base substrate proximal to the first base; and
   patterning the third conductive material film to obtain a pattern of at least one first conductive sleeve such that the first conductive sleeve is in one-to-one correspondence with the first base, and covers sides of the corresponding first base, and a surface of the corresponding first base distal to the first base substrate; and/or
   wherein the forming the at least one common electrode on a second base substrate of the second substrate comprises:
   forming a second insulating material film on the second base substrate;
   patterning the second insulating material film to obtain a pattern of at least one second base; and
   forming a fourth conductive material film on a side of the second base substrate proximal to the second base; and
   patterning the fourth conductive material film to obtain a pattern of at least one second conductive sleeve such that the second conductive sleeve is in one-to-one correspondence with the second base, and covers sides of the corresponding second base and a surface of the corresponding second base distal to the second base substrate.

2. The manufacturing method of a display panel of claim 1, wherein the first conductive material film is made of a metal material; and/or
   the second conductive material film is made of a metal material.

3. A manufacturing method of a display panel, comprising:
   forming a first substrate and a second substrate such that the first substrate comprises a first base substrate, and at least one pixel electrode and at least one common electrode are disposed on at least one of the first substrate and the second substrate;
   aligning and assembling the first substrate and the second substrate together such that that at least one orthographic projection of the at least one pixel electrode on the first base substrate are alternately arranged along a first direction in which the first base substrate extends; and
   forming a liquid crystal layer between the first substrate and the second substrate such that a ration of a height of the at least one pixel electrode to a thickness of the liquid crystal layer is in a range of 20%-50%,
   wherein the forming a first substrate and a second substrate such that the first substrate comprises a first base substrate and at least one pixel electrode and at least on common electrode are disposed on at least one of the first substrate and the second substrate comprises:
   forming the at least one pixel electrode of the first base substrate of the first substrate; and forming the at least one common electrode on a second base substrate of the second substrate,
   wherein the forming the at least one pixel electrode on the first base substrate of the first substrate comprises:
   forming a first insulating material film on the first base substrate;
   patterning the first insulating material film to obtain a pattern of at least one first base; and
   spraying or printing a third conductive material onto an outer surface of the first base to obtain a pattern of at least one first conductive sleeve such that the first conductive sleeve is in one-to-one correspondence with the first base, and covers sides of the corresponding first base and a surface of the corresponding first base distal to the first base substrate; and/or
   wherein the forming the at least one common electrode on a second base substrate of the second substrate comprises:
   forming a second insulating material film on the second base substrate;
   patterning the second insulating material film to obtain a pattern of at least one second base; and
   spraying or printing a fourth conductive material onto an outer surface of the second base to obtain a pattern of at least one second conductive sleeve such that the second conductive sleeve is in one-to-one correspondence with the second base, and covers sides of the corresponding second base and a surface of the corresponding second base distal to the second base substrate.

4. The manufacturing method of a display panel of claim 3, wherein the first conductive material film is made of a metal material; and/or
   the second conductive material film is made of a metal material.

5. The manufacturing method of a display panel of claim 1, wherein the height of the at least one pixel electrode is in a range of 0.56 μm-1.6 μm; and/or
the height of the at least one common electrode is in a range of 0.56 μm-1.6 μm.

6. The manufacturing method of a display panel of claim 3, wherein the height of the at least one pixel electrode is in a range of 0.56 μm-1.6 μm; and/or the height of the at least one common electrode is in a range of 0.56 μm-1.6 μm.

* * * * *